US00RE35902E

United States Patent [19]

Calandra, Jr. et al.

[11] E Patent Number: Re. 35,902

[45] Reissued Date of Patent: Sep. 22, 1998

[54] BEARING PLATE

[75] Inventors: Frank Calandra, Jr., Pittsburgh; John C. Stankus, Canonsburg; Eugene H. Stewart, Pittsburgh, all of Pa.

[73] Assignee: Jennmar Corporation, Paittsburgh, Pa.

[21] Appl. No.: 612,128

[22] Filed: Mar. 7, 1996

Related U.S. Patent Documents

Reissue of:

[64] Patent No.: 5,292,209
Issued: Mar. 8, 1994
Appl. No.: 61,841
Filed: May 14, 1993

[51] Int. Cl.[6] ..... E21D 21/00

[52] U.S. Cl. ..... 405/302.1; 405/259.1; 405/288; 411/545

[58] Field of Search ..... 405/302.1, 288, 405/259.1–259.6; 411/545, 531

[56] References Cited

U.S. PATENT DOCUMENTS

| | | | |
|---|---|---|---|
| 2,192,554 | 3/1940 | Misseeff-Muspratt . | |
| 2,398,130 | 4/1946 | Beijl | 405/259.1 |
| 2,667,037 | 1/1954 | Thomas et al. | 405/288 |
| 2,748,594 | 6/1956 | Edwards . | |
| 2,854,824 | 10/1958 | Curry et al. . | |
| 3,022,100 | 2/1962 | Heintzmann . | |
| 3,023,862 | 3/1962 | Launay . | |
| 3,076,672 | 2/1963 | Heintzmann et al. . | |
| 3,090,203 | 5/1963 | Durget . | |
| 3,126,708 | 3/1964 | Jasper . | |
| 3,168,815 | 2/1965 | Blenkle et al. . | |
| 3,226,934 | 1/1966 | Emery . | |
| 3,238,731 | 3/1966 | Seifert et al. . | |
| 3,395,542 | 8/1968 | Deloffre . | |
| 3,413,812 | 12/1968 | Fox . | |
| 3,415,064 | 12/1968 | Talobre | 405/302.1 |
| 3,478,523 | 11/1969 | Reusser et al. . | |
| 4,037,418 | 7/1977 | Hannan . | |
| 4,249,835 | 2/1981 | White | 405/295.1 |
| 4,439,065 | 3/1984 | Constapel | 405/151 |
| 4,507,020 | 3/1985 | Zeidler et al. | 411/531 |
| 4,634,318 | 1/1987 | Koumal | 405/259.1 |
| 4,708,559 | 11/1987 | Locotos | 411/545 |

FOREIGN PATENT DOCUMENTS

| | | |
|---|---|---|
| 1110046 | 10/1955 | France . |
| 1222640 | 1/1960 | France . |
| 3820700 | 12/1989 | Germany . |
| 3919277 | 8/1990 | Germany . |

OTHER PUBLICATIONS

"Keeping the Roof Over Your Head", Keystone Bolt Company, 1979.

"J–Channel Beams For Mine Roof Support", Coal Age, Apr., 1987.

"Jennmar Mine Roof Problem–Solving Systems", Jennmar Corporation.

"Jennmar–J–Channel Beams", Jennmar Corp., Jul. 1986.

*Primary Examiner*—Dennis L. Taylor
*Attorney, Agent, or Firm*—Webb Ziesenheim Bruening Logsdon Orkin & Hanson, P.C.

[57] ABSTRACT

An elongated channel member for supporting the surface of an underground rock formation includes a base portion with a bearing surface for contacting the rock strata and an opposite surface having a longitudinally extending central rib and flanged edges for resisting deflection and bending of the channel member under the load of the rock strata. A plurality of openings spaced a preselected distance apart extend through the central rib. A bearing plate is positioned in overlying abutting relation with each opening in the channel member. The bearing plate includes embossed areas and longitudinally flanged edges that are complementary in shape with the central rib and flanges on the channel to securely engage the bearing plate on the channel member. Thus, the bearing plate engages the channel member to restrain longitudinal and lateral movement of the bearing plate on the channel member and stiffen the channel member to resist bending. An anchor bolt extends through the aligned openings in the bearing plate and channel member into a bore hole drilled in the rock formation. Anchoring the bolt in the bore hole compresses the bearing plate against the channel member to urge the channel member into compressive relation with the surface of the rock formation to support the rock formation.

24 Claims, 3 Drawing Sheets

BEARING PLATE

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to method and apparatus for supporting a rock formation and, more particularly, to a bearing plate having an embossed configuration complementary with embossments on a channel member for exerting a compressive force on the rock formation.

2. Description of the Prior Art

In underground mining, excavation and tunnelling operations, it is conventional practice to support the overhead and lateral rock strata by elongated structural members, such as metal roof mats and channels, that extend transversely across the mine roof and downwardly along the lateral sidewalls or ribs. The mats and channels are provided in various lengths with holes spaced a preselected distance apart through the members to conform to a conventional roof bolt plan. Roof bolts extend through the holes in the channels and into holes drilled in the rock strata and are anchored in the strata to maintain the channels compressed against the surface of the rock strata. The metal mats and channels are preferably used in place of wood timbers and are more efficiently installed in combination with a roof bolting system.

U.S. Pat. No. 2,192,554 discloses an improvement over wood timbering structures in which concrete roof beams are supported in contact with a mine tunnel roof by horizontal metal props connected at their end portions to vertical props. The vertical props extend to the mine floor oppositely the mine rib or wall. This arrangement forms a truss of interlocking parts for reinforcing the roof beams. U.S. Pat. No. 3,413,812 is another example of elongated beam members connected to one another for supporting an underground rock formation.

It is also known to utilized elongated members that overlap at their end portions to form a sliding joint in an arc-type support. Examples of interconnected trough-shaped sections for supporting a rock formation are disclosed in U.S. Pat. Nos. 3,023,862; 3,076,672; 3,126,708 and 3,168,815.

U.S. Pat. No. 3,022,100 discloses an arc support formed by three sections that overlap at their end portions. U.S. Pat. No. 3,395,542 discloses a propping frame having two upright members for supporting interconnecting members forming an arc.

As indicated above, it is common practice to utilize elongated mats and channels as part of a mine roof bolt plan. In a conventional roof bolt plan, bore holes are drilled into the rock formation in accordance with a preselected pattern so that the bolts are positioned a preselected distance apart and extend a preselected depth into the rock formation. The roof bolts are anchored in the bore holes and tensioned to exert a compressive force upon the rock strata to prevent deterioration of the overhead rock strata.

It is also conventional practice in the installation of mine roof bolts to use bearing plates so support the area of the rock formation around the bore hole. A conventional bearing plate includes a contact or bearing surface for abutting the formation around the bore hole. The bearing plate includes a central hole for receiving a roof bolt which extends through the plate up into the bore hole. The lower end of the roof bolt includes an enlarged head which bears against the area of the plate around the bore hole. To rigidify bearing plates to resist deflection and bending when compressed against the rock formation, bearing plates are provided with embossments which extend from the surfaces of the bearing plates. Examples of known bearing plates having embossments are disclosed in U.S. Pat. Nos. 2,748,594; 2,854,824; 3,090,203; 3,226,934; 3,238,731; 3,478,523; 4,037,418; and 4,249,835 and French Patent Nos. 1,222,640 and 1,304,298.

The bearing plates can be used [With] *with* or without mat or channel supports. When used with mats and channels, the bearing plate is positioned in overlying relation with the channel so that the opening of the channel is aligned with the opening in the roof plate. In one method, the roof plate used with a mat or channel has a width equal to the width of the channel and a length to be received within the elongated slot of the channel. In the alternative, the surface of the bearing plate extends beyond the channel slot and bears against the areas of the channel around the slot.

Because of the extended length of the mat or channel, it is subject to deflection and bending when anchored by the roof bolts into compressive relation with the rock strata. Therefore, there is need for a channel or mat having a structure that is reinforced to resist deflection and bending under the load of the rock formation. The channel shaped support structure should be maintained in compressive relation with the surface of the rock formation by a bearing plate maintained in contact with the channel by the anchored roof bolt. The bearing plate should have a configuration that permits its installation within the width of the channel and in overlying relation with the opening in the channel. The bearing plate should have a configuration which stabilizes the bearing plate on the channel and also serves to reinforce the channel to resist deflection loads.

SUMMARY OF THE INVENTION

In accordance with the present invention, there is provided apparatus for supporting a rock formation that includes an elongated member having a base portion with a length substantially greater than a width defining longitudinal edges forming a channel therebetween. The base portion has a bearing surface for contacting the rock formation and an opposite surface. Means is provided for reinforcing the elongated member extending the length of the base portion and positioned centrally on the opposite surface within the channel. At least one opening extends through the means for reinforcing the elongated member. A bearing plate includes a contact surface and an outer surface. The contact surface is positioned in overlying abutting relation with the elongated member opposite surface. A circular embossed area extends outwardly from the plate outer surface and defines a recessed portion having a bottom wall with a central opening therethrough. The recessed portion bottom wall is positioned in the opening in the elongated member and is positioned adjacent to the means for reinforcing the elongated member to restrain longitudinal movement of the plate on the elongated member. The plate central opening is aligned with the elongated member opening. A longitudinal embossed area extends outwardly from opposite sides of the circular embossed area of the bearing plate into overlying relation with the means for reinforcing the elongated member. The longitudinal embossed area projects from the plate outer surface in a configuration complementary with the configuration of the means for reinforcing the elongated member. The plate longitudinal embossed area is engaged to the means for reinforcing the elongated member to restrain lateral movement of the plate on the elongated member to stationarily position the plate on the elongated member. Anchor means extend through the aligned openings into the rock formation and bear against the plate recessed portion for urging the elongated member into compressive engagement with the rock formation to support the rock formation.

Further, in accordance with the present invention, there is provided a bearing plate that includes a planar body portion having a longitudinal axis defining planar longitudinal edges and planar transverse edges. A contact surface is positioned on one side of the body portion for engaging a generally planar surface and on the opposite side of the body portion is provided an outer surface. An embossed area extends outwardly from the body portion outer surface. The embossed area includes a circular embossment centered on the body portion and a longitudinal embossment extending outwardly from opposite sides of the circular embossment on the longitudinal axis. The circular and longitudinal embossments centrally and longitudinally rigidify the body portion to resist deflection. The circular embossment includes a recessed portion having a bottom wall with a central opening therethrough. The longitudinal edges extend angularly from the body portion outer surface to form flanges for stiffening the longitudinal edges to resist bending.

Additionally, the present invention is directed to a method for supporting a rock formation that includes the steps of positioning an elongated channel member in contact with a planar surface of a rock formation. The reinforcing member has a longitudinal embossment that extends the length of the channel member. Openings are positioned in the channel member in spaced relation along the length of the embossment. A bearing plate having a contact surface is positioned in overlying abutting relation with the channel member around each opening therethrough. A recessed portion of the bearing plate is positioned within the opening of the channel member so that an opening in the bearing plate is aligned with the opening in the channel member. The bearing plate is restrained from longitudinal movement on the channel member. The bearing plate is restrained from lateral movement on the channel member. An anchor bolt extends through the aligned openings in the bearing plate and the channel member into engagement with the rock formation to compress the bearing plate against the channel member to maintain the channel member in bearing contact with the surface of the rock formation.

Accordingly, a principal object of the present invention is to provide method and apparatus for supporting a rock formation by an elongated mat or channel reinforced to resist bending when compressed by bearing pates against the rock formation.

Another object of the present invention is to provide a reinforced mine roof support channel or mat used with bearing plates having a configuration complementary with the reinforced configuration of the mat or channel and spaced a preselected distance apart on the surface of the channel.

A further object of the present invention is to provide a bearing plate for reinforcing a rock formation in which the bearing plate has an embossed configuration for strengthening the plate to resist bending when compressed against the rock formation.

These and other objects of the present invention will be more completely disclosed and described in the following claims.

DESCRIPTION OF THE PREFERRED EMBODIMENTS

Figure 2:
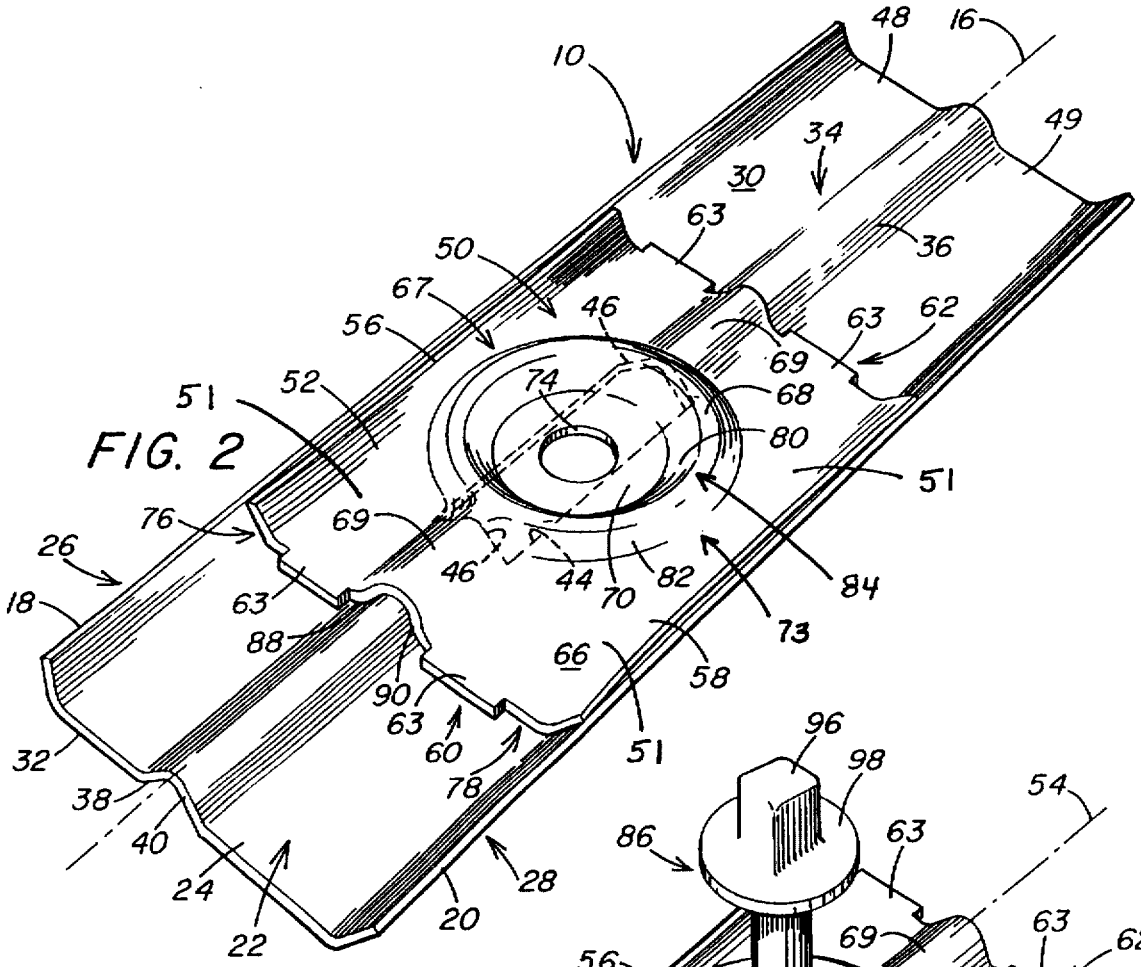
FIG. 2 is an isometric view of the bearing plate positioned in overlying abutting relation with a channel member, illustrating the center embossed area of the bearing plate overlying a longitudinal slot in a center rib of the channel member with planar portions of the bearing plate in contact with the planar portions of the channel member.
Figure 1:
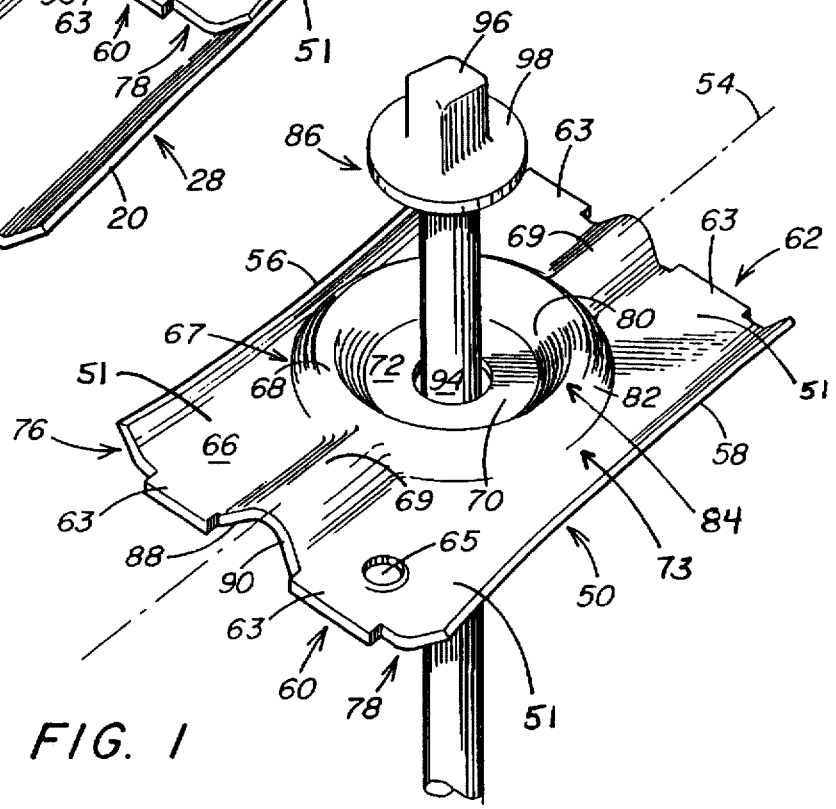
FIG. 1 is an isometric view of a bearing plate having circular and longitudinal embossments on the surface of the plate, illustrating an anchor bolt for securing the plate against a rock formation.
Figure 3:
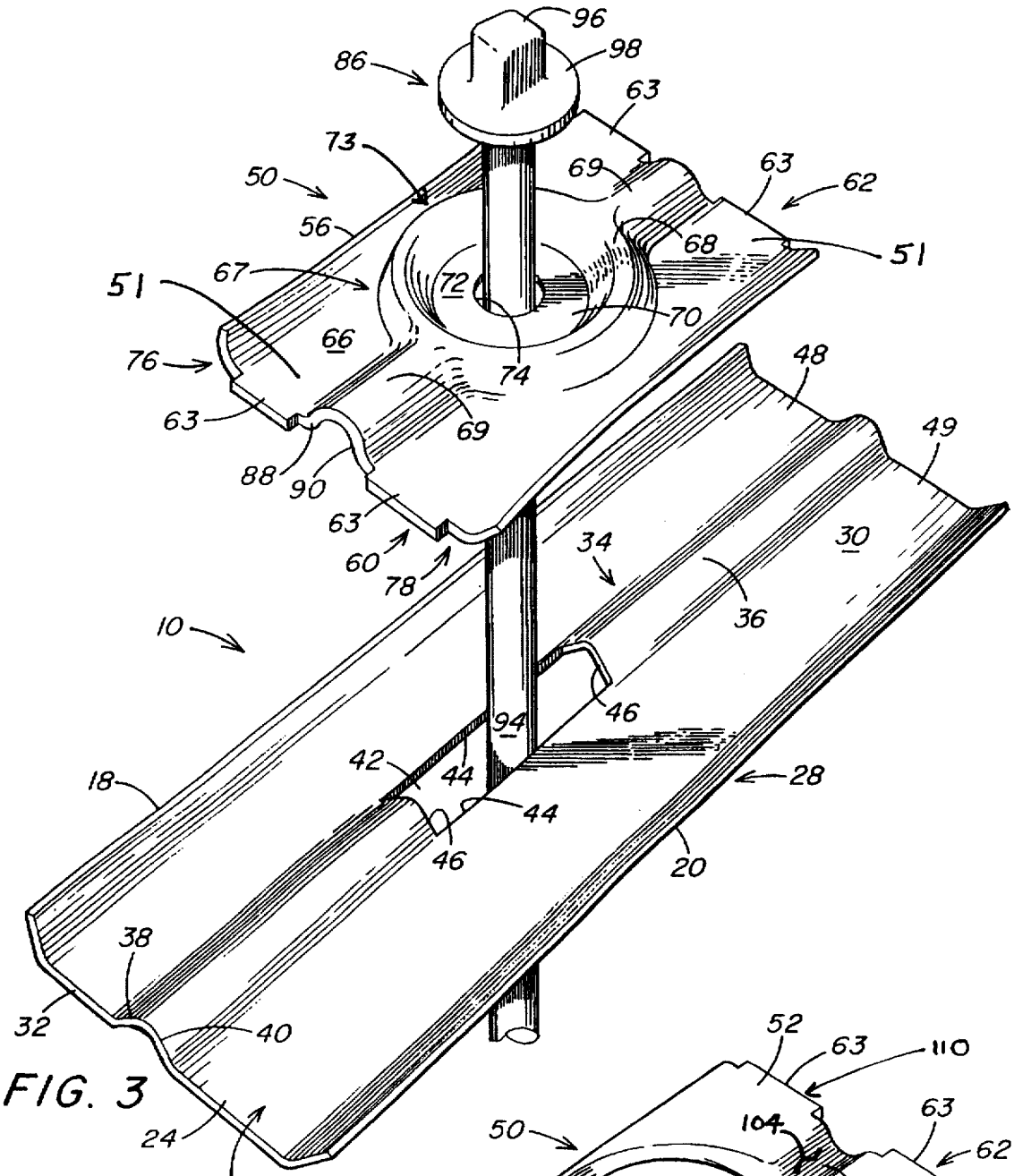
FIG. 3 is an isometric view of an assembly of an anchor bolt, bearing plate, and channel member for supporting a rock formation, illustrating the bearing plate having a reinforced configuration complementary with the reinforced configuration of the channel member.
Figure 8:
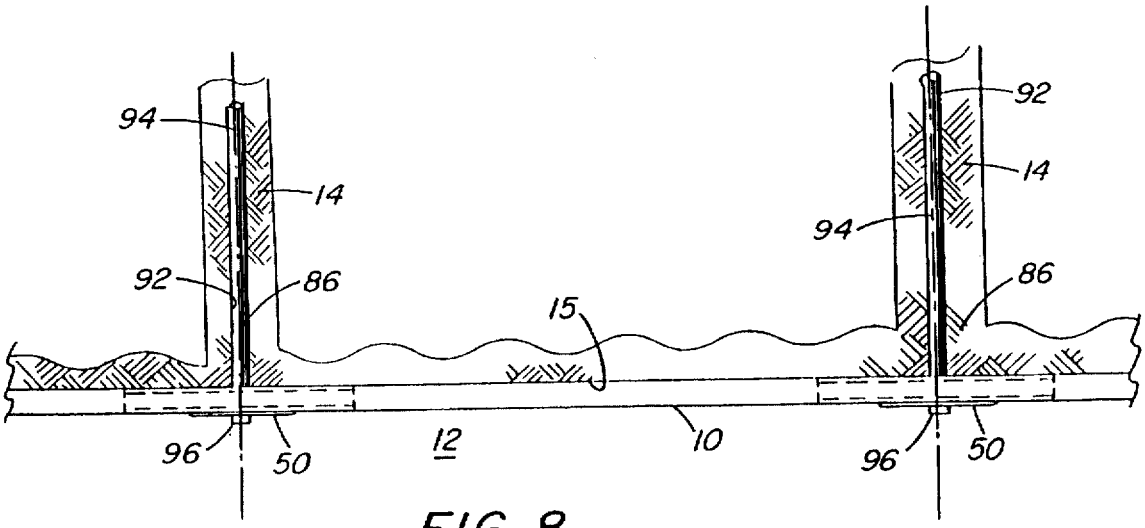
FIG. 8 is a schematic, fragmentary sectional view of a channel member secured by a pair of anchor bolts to a rock formation with bearing plates compressed by the head of the bolts against the channel member.

Referring to the drawings and, particularly to FIGS. 1–3, there is illustrated an elongated structural support member generally designated by the numeral 10 for supporting an underground rock formation, such as a mine tunnel, passageway, or excavation formed during a material dislodging operation. A representative underground rock formation is illustrated in FIG. 8 in which a mine passageway 12 is cut in rock strata 14, forming a mine roof 15 and a pair of laterally spaced sidewalls and a mine floor (not shown).

As illustrated in FIGS. 2 and 3, the structural member 10 has an elongated channel-shaped configuration defined by a longitudinal axis 16. The length of the channel member 10 is substantially greater than the width, defining longitudinal edges 18 and 20 forming a channel therebetween generally designated by the numeral 22.

Preferably, the structural member 10 is fabricated of metal, such as iron or steel or any other suitable material. In one example, the channel member 10 is fabricated of galvanized steel and is supplied in a number of different lengths from 4½ feet up to 20 feet with a thickness of about 3/16 inch.

Figure 5:
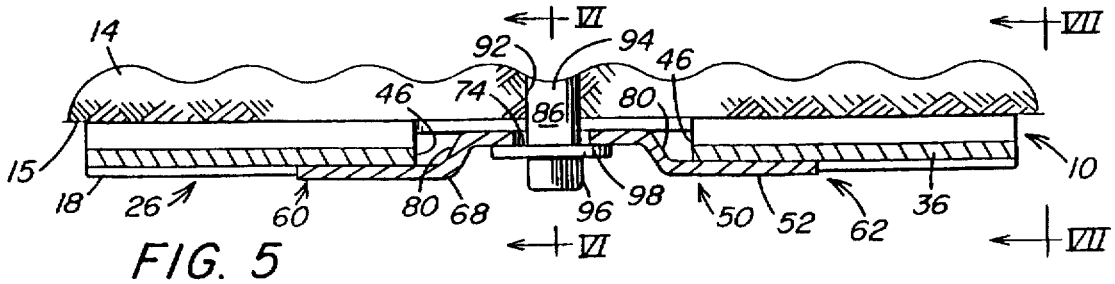
FIG. 5 is a fragmentary sectional view in side elevation of the assembled bearing plate and channel member shown in FIG. 3, illustrating the bolt anchored in the rock formation with the head of the bolt compressing the bearing plate against the channel member abutting the rock formation.
Figure 6:
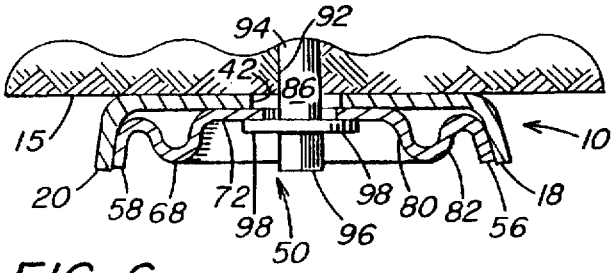
FIG. 6 is a sectional view taken along line VI—VI of FIG. 5, illustrating the reinforced surfaces of the bearing plate in contact with the reinforced surfaces of the channel member compressed by the anchored bolt against the rock formation.
Figure 7:
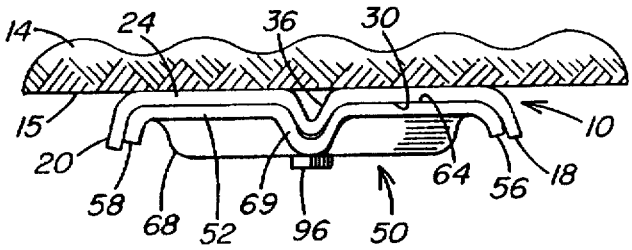
FIG. 7 is an end view taken along line VII—VII of FIG. 5, illustrating the complementary surfaces of the bearing plate and channel member for securely positioning the bearing plate on the channel member to compress the channel member against the rock formation.

The structural member 10 illustrated in FIGS. 1 and 3 includes a base portion 24 extending the length of the member 10. Longitudinal edges 18 and 20 extend angularly from the base portion 24. The edges 18 and 20 are formed integral with the base portion 24 to provide reinforcing flanges generally designated by the numerals 26 and 28 that extend laterally the length of the channel member 10. The flanges 26 and 28 extend angularly from a planar surface 30 on one side of the base portion 24. The opposite side of the base portion 24 includes a bearing surface 32 for contacting the rock strata as illustrated in FIGS. 5–7. The flanges 26 and 28 extend a preselected height from the planar surface 30.

The elongated channel member 10 includes a reinforcing portion generally designated by the numeral 3 that extends the length of the base portion 24. Preferably, the reinforcing portion 34 is positioned centrally on the planar surface 30 within the channel 22. The reinforcing portion 34 is formed in a preselected configuration. For example, as illustrated in FIG. 2 the reinforcing portion 34 has a generally V-shape configuration that forms a rib 36 extending the length of the channel member 10. The height of the rib 36 is approximately equal to the height of the lateral flanges 26 and 28 to form the channel 22 between the center rib 36 and the lateral flanges 26 and 28.

The V-shaped rib 36 on the channel member 10 includes a pair of web sections 38 and 40 that are integrally formed to extend angularly with respect to the base portion 24. The web sections 38 and 40 are joined at an arcuate crown on the rib 36. It should be understood that the reinforcing portion 34 may be embossed on the channel member 10 in any desired configuration. Thus, the reinforcing portion 34 and the flanges 26 and 28 provide the elongated channel member 10 with structural rigidity to resist bending and torsional forces applied by the rock strata 14 when installed to support the rock formation as shown in FIG. 8.

The elongated channel member 10 includes a plurality of spaced apart openings 42. For purposes of illustration, only one opening 42 is shown in the channel member 10 in FIGS. 2 and 3. However, it should be understood that regardless of the length of the channel member 10, a selected number of openings may be spaced a preselected distance apart on the reinforcing portion 34. In one embodiment, as shown in FIGS. 2 and 3, the openings 42 have a length greater than a width to form a slot-like configuration.

As shown in FIG. 3, the openings or slots 42 are defined by opposite longitudinal side edges 44 positioned in the plane of the planar surface 30. Extending transversely between the ends of the side edges 44 are abutment walls 46 which extend in an inverted V-shape upwardly from the base portion 24. With this arrangement, an opening or a slot 42 is formed in the longitudinally extending reinforcing rib 36. In an alternate embodiment, the openings 42 are circular in configuration with abutment walls 46 spaced from the circular opening by a planar surface of the channel member immediately around the circular opening.

The angularly extending flanges 26 and 2 together with the V-shaped rib 36 form a pair of troughs 48 and 49 on the channel member 10. The troughs 48 and 49 combined with the central rib 36 and flanges 26 and 28 extend the length of the channel member 10. This structure serves to stiffen the channel member 10 to resist bending.

As shown in FIG. 2, the planar surface 30 together with the lateral flanges 26 and 2 and the central rib 36 of the channel member 10 form a receiving surface for a bearing plate generally designated by the numeral 50. The bearing plate 50 has a generally planar body portion 52 having a longitudinal axis 54, as shown in FIG. 1, defining longitudinal edges 56 and 58 and transverse edges 60 and 62.

In the embodiment shown in FIG. 1, the longitudinal edges 56 and 58 are arcuately shaped. Also, in the process of the die stamping the plate 50 the transverse edges 60 and 62 are sheared forming pairs of tabs 63 on the edges of the plate on opposite sides of a longitudinal embossment 69.

Figure 4:
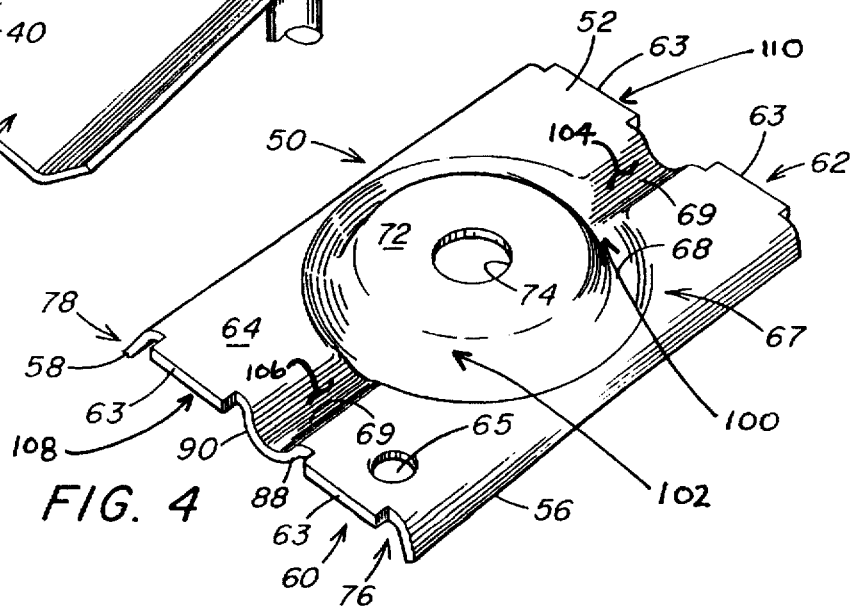
FIG. 4 is a bottom isometric view of the bearing plate shown in FIG. 1.

As shown in FIG. 4, the plate body portion 52 includes on one side a contact surface 64 for engaging the planar surface 30 of the channel member 10. The bearing plate 50 includes on the opposite side an outer surface 66. As an added feature, the plate outer surface 66, as shown in FIG. 1, includes an opening 65 punched through the plate surface 66 to form a conventional hanger hole. The opening 65 is used to hang objects, such as brattice cloth, electrical wires, and other equipment in the mine, from the plate 50 at the mine roof. It should be understood that the bearing plate 50 is also used without the channel member 10, as shown in FIG. 1. In this embodiment, the plate surface 64 is positioned in direct contact with the surface of the rock formation to be reinforced.

The bearing plate 50 includes an embossed area generally designated by the numeral 67 in which a circular embossment 68 is centered on the plate body portion 52 and a longitudinal embossment 69 extends outwardly from opposite sides of the circular embossment 68 on the longitudinal axis 54. The circular and longitudinal embossment 68 and [6] *69* centrally and longitudinally rigidify the plate body portion 52 to resist deflection. [The] *A central portion 73 includes the* circular embossment 68 *that* includes a recessed portion 70 having a bottom wall 72 with a central opening 74 therethrough.

As shown in FIG. 1, the bearing plate longitudinal edges 56 and 58 extend angularly from the outer surface 66 of the plate body portion 52 to form flanges or ribs generally designated by the numerals 76 and 78. The ribs 76 and 78 provide the bearing plate 50 with a channel configuration strengthened by the embossments 68 and 69. The ribs 76 and 78 also serve to stiffen the plate longitudinal edges 56 and 58 to resist bending. The arcuate configuration of the longitudinal edges 56 and 58 also adds rigidity to the plate 50. Therefore, the bearing plate 50 has an overall reinforced structure effective to support a rock formation alone without the addition of the channel member 10.

As seen in FIGS. 2 and 7, the channel member 10 and bearing plate 50 have complementary transverse profiles which permit the bearing plate 50 to be positioned in overlying abutting relation with the channel member 10 around the opening 42 in the channel member 10. The overlying abutting relation of the bearing plate 50 with the channel member 10 forms a composite reinforced channel assembly.

The bearing plate 50 has a generally rectangular, channel-like configuration defined by the longitudinal edges 56 and 58 and the transverse edges 60 and 62. The width of the bearing plate 50 corresponds to the width of the channel member 10 so that the bearing plate 50 is received on the channel member 10 with the longitudinal flanges 76 and 78 bearing against the channel member flanges 26 and 28 as shown in FIGS. 2, 6 and 7.

As shown in FIG. 1, the bearing plate edges 76 and 78 extend outwardly from the plate outer surface 66 at an angle substantially corresponding to the angle formed by each of the channel member edges 18 and 20 with the planar surface 30. In one example, the bearing plate 50 has a width of about 5 inches extending between the longitudinal edges 56 and 58. The length of the bearing plate 50 is also selective, for example about six inches.

Preferably, the bearing plate 50 has a minimum length which exceeds the length of the elongated opening 42 in the channel member 10, as shown FIG. 3. In one example, the opening 42 has a length of about 3.5 inches, and the bearing plate 50 has a nominal length of about 6.0 inches. In another example, the opening 42 is circular corresponding to the diameter of the circular opening in the bearing plate 50 shown in FIG. 1. Regardless of the configuration of the opening 42, the bearing plate 50 has a length which provides for substantial overlying relation of the bearing plate contact surface 64 with the channel member planar surface 30. As will be explained later in greater detail, the overlying contact of the bearing plate 50 with the channel member 10 assures that the channel member 10 is maintained in compressive relation with the rock strata 14 and is reinforced in the area around the opening 42 to resist lateral and transverse bending of the channel member 10.

As seen in FIGS. 2 and 7, the bearing plate contact surface 64 extends from the circular embossment 68 into overlying relation with the channel central rib 36 and the planar surface 30 of the channel member 10 around the opening 42 in the rib 36. The bearing plate circular embossment 68 includes the bottom wall 72, as shown in FIG. 4, which has a diameter less than the length of the opening 42 in the channel rib 36. In the case of circular opening 42, a planar surface 30 of the channel member 10 between the embossments 36 receives the plate bottom wall 72. As shown in FIGS. 5 and 6, the bottom wall 72 is supported on the channel planar surface 30 opposite the opening 42. A portion of the bottom wall 72 spans the slot 42 with the outer portions of the bottom wall 72 in contact with the surface 30 around the opening 42.

The bearing plate circular embossment 68, as seen in FIGS. 1 and 6, includes a curved inner leg 80 and a curved outer leg 82 that merge to form an arcuate, top portion 84. As seen in FIG. 5, the inner leg 80 extends to the plate bottom wall 72 and is positioned oppositely of the slot abutment walls 46 of the channel member 10. Thus, longitudinal movement of the bearing pate 50 on the channel member 10 is restrained by contact of the circular embossment inner legs 80 with the slot abutment walls 46.

When the bearing plate 50 is used to reinforce the channel member 10, as shown in FIG. 2, the plate bottom wall 72 and the recessed portion 70 is positioned in overlying relation with the channel opening 42. The bearing plate opening 74 overlies the channel opening 42. A limited amount of longitudinal movement of the bearing plate 50 on the channel member 10 is permitted before the embossment inner legs 80 contact either one of the adjacent channel abutment walls 46. Also, the width of the channel slot 42 exceeds the diameter of the plate central opening 74 to permit unobstructed passage of an anchor bolt 86 through the aligned openings 42 and 74, as shown in FIG. 3.

In the embodiment of the channel member 10 containing a circular opening rather than the elongated opening 42, the plate opening 74 is aligned with the channel circular opening. The plate bottom wall 72 then seats on a plate surface of the channel member around the circular opening between the spaced apart adjacent walls 46 of the channel rib 36.

The longitudinal embossment 69 of the bearing plate 50 extends diametrically from opposed sides of the circular embossment 68. The longitudinal embossment 69 is aligned with the longitudinal axis 54 of the bearing plate 50, as shown in FIG. 1. The plate longitudinal embossment 69 has a configuration complementary with the configuration of the longitudinal embossment o rib 36 of the channel member 10. Therefore, the plate embossment 69 overlies in abutting relation the channel rib 36, as seen in FIGS. 2 and 7.

The plate longitudinal embossment 69 extends from the circular embossment 68 the length of the plate 50. Thus, the longitudinal embossment 69 rigidifies and strengthens the plate 50 to resist deformation and bending along the axis 54 of the plate 50. Also, as seen in FIGS. 1 and 6 the plate circular embossment 68 extends substantially the width of the bearing plate 50. The circumferential edge of the circular embossment 68 extends closely adjacent to the longitudinal flanges 76 and 78. Thus, with the circular embossment 68 extending the width of the plate 50, the plate 50 is reinforced to resist deformation and bending along its transverse axis. The circular and longitudinal embossments 68 and 69 of the plate 50 combine to provide the bearing plate 50 with enhanced rigidity to reinforce a channel member, as shown in FIGS. 5–8, or when used alone, as shown in FIG. 1, to contact a mine roof when compressed against the roof surface by a roof bolt assembly anchored in the mine roof.

Similar in construction to the channel rib 36, the plate longitudinal embossment 69 includes a pair of web sections 88 and 90 that are integral with and extend angularly with respect to the plate body portion 50. The web sections [89] *88* and 90 are joined to form an arcuate crown which is positioned at the elevation of the crown or top portion 84 of the plate circular embossment 68. The web sections [89] *88* and 90 extend from the plate surface 66 at approximately the same angle which the channel web portions 38 and 40 extend from the channel surface 30. This arrangement permits the longitudinal embossment 69 of the plate 50 to [overly] *overlie* in abutting complementary relationship the channel rib 36. Thus, the bearing plate 50 engages the channel member 10 by abutting contact of the longitudinal embossment 69 with the channel rib 36 to resist lateral movement of the bearing plate 50 on the channel member 10.

The bearing plate 50 is further restrained from moving laterally on the channel member 10 by the abutting relation of the plate flanges [26 and 28] *56 and 58* with the channel member flanged edges 18 and 20. This relationship is clearly shown in FIG. 2. The plate flanges [26 and 28] *56 and 58* have an arcuate configuration so that the end portions of the flanges [26 and 28] *56 and 58* are urged against the channel flanged edges 18 and 20, as shown in FIG. 2.

The bearing plate 50 is provided with a width which allows the plate 50 to be received between the channel edges 18 and 20. The plate edges 56 and 58 extend approximately at the same angle from the plate surface 66 that the channel edges 18 and 20 extend from the channel surface 30. Preferably, the edges 18, 20 and 56, 58 extend at an angle greater than 90° from the respective planar surfaces 30 and 66.

The overlapping abutting relation of the flanged edges of the bearing plate 50 and channel member 10 is also clearly illustrated in FIGS. 6 and 7. Not only do the circular and longitudinal embossments 68 and 69 and the flanges [26 and 28] *56 and 58* rigidify or stiffen the bearing plate 50 to resist bending, they also provide means for engaging the bearing plate 50 to the channel member 10 in a position where the bearing plate 50 is restrained from both longitudinal and lateral movement on the channel member 10. This serves to maintain the central opening 74 of the bearing plate 50 in alignment with the opening 42 of channel member 10. Furthermore, the area of contact of the 1 bearing plate 50 with the channel member 10 is increased, enhancing the compressive forces applied by the bearing plate to the channel member.

The planar portions of the bearing plate 50 between the circular and longitudinal embossments 68 and 69 and the lateral flanges [26 and 28] *56 and 58* form channel portions which extend into overlying abutting relation with corresponding channel portions 48 and 49 of the channel member 10. *The channel portion defines two legs 51 secured to opposite sides of the central portion 73 through the embossment 68. Thus, portions of the legs 51 and sides 100 and 102 of the embossment 68 positioned on opposite ends of the central portion 73 define rib receiving openings 104 and 106.* As seen in FIG. 4, the contact surface 64 on the bottom of the plate 50 forming the bearing plate channel portions provides a substantial bearing surface for engagement with the surface 30 within the channel portions 48 and 49. The plate contact surface 64 applies compressive forces to an expanded area of the channel member around the opening 42. In this manner, the anchored channel member 10 is maintained in compressive relation with the rock strata 14.

Initially the plate member 50 and the channel member 10 are positioned in overlying, abutting relation, as shown in FIG. 2, with the channel bearing surface 32 positioned in contact with the rock strata 14 as shown in FIGS. 5–7[.], *so that legs 51 straddle portions of the central rib 36 and the central portion 51 of the bearing plate is positioned within the channel opening 42 and the opening 74 is aligned with the channel opening 42.* The anchor bolt 86 is extended through the aligned openings 74 and 42 into a bore hole 92 drilled in the rock formation 14. The anchor bolt 86 is conventional in design and includes an elongated shank 94 having at one end an integral bolt head 96 and washer 98 and at an opposite end a conventional mechanical expansion assembly (not shown) positioned within the bore hole 92. Conventional, resinous bonding material may also be utilized in the bore hole 92 to secure the anchor bolt 86.

With the bearing plate 50 compressed against the channel member 10 engaging the surface of the rock strata around the bore hole 92, rotation of the anchor bolt 86 expands the expansion shell assembly into gripping engagement with the wall of the bore hole. This places the bolt 86 in tension so that the layers of the rock strata are compressed together. The anchored bolt 86 maintains the channel member 10 compressed against the surface of the rock strata 14. The bearing plate 50 is compressed by the anchored bolt 86 against the channel member 10. The bearing plate 50 is securely maintained in position on the channel member 10. Both the bearing plate 50 and the channel member 10 are reinforced to resist bending and deflection under the load of the rock strata, as above described. *As can be seen in FIG. 2, the channel member 10 extends along the longitudinal axis or direction 16 as does the central rib 36. Each of the legs 51 longitudinally extends from a first end 108 to a second end 110. The channel opening 42 is positioned between legs 51, and the first end 108 and the second end 110 of each respective leg longitudinally extends beyond the channel opening 42.*

As seen in FIGS. 5 and 6, when the bolt 86 is anchored within the bore hole 92, the washer 98 on the bolt head 96 is compressed against the bottom wall 72 of the bearing plate 50 around the hole 74. The washer 98 prevents the bolt 86 from passing through the bearing plate 50. Also, other devices can be used to anchor the bolt 86 in the bore hole. For example, a resin system may be utilized to secure the bolt 86 in the bore hole 92 by bonding of the bolt 86 to the rock strata surrounding the bore hole 92. Also as well known in the art, a combination expansion shell assembly and resin system can be used to anchor the bolt in the bore hole.

Conventionally, the bore holes 92 are drilled in the rock strata as a part of the primary mining cycle in the formation of the underground or mine passageway. Thus as the mine passageway is being formed, the channel members 10 and the bearing plates 50 or the bearing plates 50 alone are installed to support the rock strata. Conventionally, the channel members 10 are installed to extend transversely across the mine roof between the lateral sidewalls of the mine passageway. The channel members may also be installed to extend vertically on the sidewalls between the mine roof and floor.

The channel members 10 are provided in accordance with the present invention in a number of different lengths that vary from about 4.5 feet to 20 feet. Regardless of the length of the channel member 10, the openings 42 are located a preselected distance apart to correspond to the required roof of gauges, for example, from 7 to 16 gauge galvanized steel.

Referring to FIG. 8, there is illustrated a continuous length of channel member 10 having at least two openings 42 spaced a preselected distance apart for receiving anchor bolts 86 to be secured in bore holes 92 drilled in the rock strata 14. The elongated configuration of the channel openings 42 facilitates efficient alignment of the openings 42 with predrilled bore holes 92. Because of the extended length of the channel member 10, it is subject to deflection and bending under the load of the rock strata 14. The provision of the reinforced structure of the channel member 10, as above described, and installation of the bearing plates 50 having a reinforced configuration complementary with the configuration of the channel member 10 serves to stiffen the channel member 10 to resist bending and deflection.

According to the provisions of the patent statutes, we have explained the principle, preferred construction, and mode of operation of our invention and have illustrated and described what we now consider to represent its best embodiments. However, it should be understood that within the scope of the appending claims the invention may be practiced otherwise than as specifically illustrated and described.

We claim:

1. Apparatus for supporting a rock formation comprising, an elongated member having a base portion with a length substantially greater than a width defining longitudinal edges forming a channel therebetween, said base portion having a bearing surface for contacting the rock formation and an opposite surface, means for reinforcing said elongated member extending the length of said base portion and positioned centrally on said opposite surface within said channel, at least one opening extending through said means for reinforcing said elongated member, a bearing plate including a contact surface and an outer surface, said contact surface positioned in overlying abutting relation with said elongated member opposite surface, a circular embossed area extending outwardly from said plate outer surface and defining a recessed portion having a bottom wall with a central opening therethrough, said recessed portion bottom wall positioned in said opening in said elongated plate and positioned adjacent to said means for reinforcing said elongated member to restrain longitudinal movement of said plate on said elongated member, said plate central opening aligned with said elongated member opening, a longitudinal embossed area extending outwardly from said opposite sides of said circular embossed area of said bearing plate into overlying relation with said means for reinforcing said elongated member, said longitudinal embossed area projecting from said plate outer surface in a configuration complementary with the configuration of said means for reinforcing said elongated member, said plate longitudinal embossed area engaged to said means for reinforcing said elongated member to restrain lateral movement of said plate on said elongated member to stationarily position said plate on said elongated member, and anchor means extending through said aligned openings into the rock formation and bearing against said plate recessed portion for urging said elongated member into compressive engagement with the rock formation to support the rock formation.

2. Apparatus for supporting a rock formation as set forth in claim 1 in which, said means for reinforcing said elongated member includes a central rib embossed on said base portion opposite surface, and said central rib extending the length of said channel member with a plurality of openings extending through said rib and spaced a preselected distance apart on said rib.

3. Apparatus for supporting a rock formation as set forth in claim 2 in which, said openings in said central rib each have the configuration of a slot with a width equal to the width of said central rib and extending a preselected length along said central rib.

4. Apparatus for supporting a rock formation as set forth in claim 1 in which, said opening in said means for reinforcing said elongated members is defined by opposite longitudinal side edges positioned in the plane of said opposite surface and opposite transverse abutment walls extending upwardly from said opposite surface.

5. Apparatus for supporting a rock formation as set forth in claim 4 in which, said bearing plate recessed portion is positioned in said elongated member opening with said bearing plate bottom wall positioned oppositely of said abutment walls to restrain longitudinal movement of said bearing plate on said elongated member.

6. Apparatus for supporting a rock formation as set forth in claim 1 in which, said bearing plate contact surface extends from said circular embossed area into overlying relation with said means for reinforcing said elongated member and said opposite surface of said elongated member base portion around said opening.

7. Apparatus for supporting a rock formation as set forth in claim 1 in which, said means for reinforcing said elongated member includes a rib extending longitudinally and positioned centrally on said base portion, and said rib including a pair of web sections connected at one end to each other and angularly disposed relative to one another and connected at an opposite end to said base portion.

8. Apparatus for supporting a rock formation as set forth in claim 7 in which, said bearing plate longitudinal embossed area extends from diametrically opposed sides of said circular embossed area, and said longitudinal embossed area has a configuration complementary with the configuration of said rib to overlie said rib to restrain said bearing plate from moving laterally on said elongated member.

9. Apparatus for supporting a rock formation as set forth in claim 1 which includes, means for restraining lateral movement of said bearing plate on said elongated member.

10. Apparatus for supporting a rock formation as set forth in claim 9 in which, said means for restraining lateral movement of said bearing plate includes said elongated member having longitudinal edge portions with flanges extending angularly from said base portion, and said bearing plate including longitudinal edge portions with flanges extending angularly from said outer surface into overlying abutting relation with said elongated member flanges.

11. Apparatus as set forth in claim 10 in which, said elongated member and said bearing plate have complementary transverse profiles positioned in overlying abutting relation to form a composite channel assembly.

12. A bearing plate comprising, a planar body portion having a longitudinal axis defining planar longitudinal edges and planar transverse edges, a contact surface for engaging a generally planar surface on one side of said body portion and an outer surface on an opposite side of said body portion, an embossed area extending outwardly from said body portion outer surface, said embossed area including a circular embossment centered on said body portion and a longitudinal embossment extending outwardly from opposite sides of said circular embossment on said longitudinal axis, said circular and longitudinal embossments centrally and longitudinally rigidify said body portion to resist deflection, said circular embossment including a recessed portion having a bottom wall with a central opening therethrough, and said longitudinal edges extending angularly from said body portion outer surface to form flanges for stiffening said longitudinal edges to resist bending.

13. A bearing plate as set forth in claim 12 in which, said longitudinal embossment has a V-shaped configuration extending from said circular embossment the length of said body portion on said longitudinal axis.

14. A bearing plate as set forth in claim 12 in which, said longitudinal embossment includes a reinforcing rib extending centrally on said body portion, said reinforcing rib including a pair of web sections angularly disposed relative to one another, and said web sections being connected at one end to each other and connected at an opposite end to said base portion.

15. A bearing plate as set forth in claim 12 which includes, channel portions on said body portion outer surface between said circular and longitudinal embossments and said flanges on said longitudinal edges.

16. A bearing plate as set forth in claim 12 in which, said flanges extend angularly from said outer surface at an angle to a height of about the height of said circular embossment from said outer surface, and said flanges form with said circular and longitudinal embossment channel portions on said body portion outer surface.

17. A method for supporting a rock formation comprising the steps of, positioning an elongated channel member in contact with a planar surface of a rock formation, reinforcing the channel member with a longitudinal embossment extending the length of the channel member, positioning openings in the channel member in spaced relation along the length of the embossment, positioning a bearing plate having a contact surface in overlying abutting relation with the channel member around each opening therethrough, positioning a recessed portion of the bearing plate within the opening of the channel member so that an opening in the bearing plate is aligned with the opening in the channel member, restraining longitudinal movement of the bearing plate on the channel member, restraining lateral movement of the bearing plate on the channel member, and extending an anchor bolt through the aligned openings in the bearing plate and the channel member into engagement with the rock formation to compress the bearing plate against the channel member to maintain the channel member in bearing contact with the surface of the rock formation.

18. A method as set forth in claim 17 which includes, extending a longitudinal embossment of the bearing plate in overlying abutting relation with the longitudinal embossment of the channel member.

19. A method as set forth in claim 17 which includes, extending longitudinal edges of the channel member angularly and downwardly from the surface of the rock formation, and extending longitudinal edges of the bearing plate into overlying abutting relation with the channel member longitudinal edges.

20. A method as set forth in claim 17 which includes, positioning the recessed portion of the bearing plate within an elongated slot of the channel member to restrain longitudinal movement of the bearing plate beyond the slot, and extending the bearing plate contact surface into overlying abutting relation with the surface of the channel member around the slot to reinforce the channel member around the slot.

*21. An apparatus for supporting a rock formation comprising:*

*an elongated member having a base portion with a length substantially greater than a width defining longitudinal edges forming a channel therebetween, said base portion having a bearing surface for contacting the rock formation and an opposite surface;*

*a central rib defined on said base portion opposite surface extending the length of said base portion and positioned centrally on said opposite surface within said channel, and at least one opening extending through said rib;*

*a bearing plate including a contact surface and an outer surface, said contact surface positioned in abutting relation with said elongated member opposite surface, said bearing plate defining a central opening aligned with said elongated member opening, said bearing plate including a central portion which defines the central opening and two spaced apart legs positioned on and secured to opposite sides of said central portion and two rib receiving openings defined by portions of said legs and sides positioned on opposite ends of said central portion, whereby respective portions of said central rib positioned on opposite sides of said elongated member opening are received within the rib receiving openings; and*

*an anchor extending through said aligned openings into the rock formation and bearing against said bearing plate central portion for urging said bearing plate into compressive engagement with said elongated member to reinforce said elongated member compressed against the rock formation to support the rock formation.*

*22. The apparatus for supporting a rock formation as claimed in claim 21, wherein said bearing plate central portion is attached to said legs through an embossed portion.*

*23. The apparatus for supporting a rock formation as claimed in claim 21, wherein said elongated member extends along a longitudinal axis and said central rib extends along the longitudinal axis, each of said legs of said bearing plate longitudinally extends from a first end to a second end, whereby said elongated member opening is positioned between said legs and said first end and said second end of each respective leg longitudinally extends beyond the elongated member opening.*

*24. A method for supporting a rock formation, comprising the steps of:*

*positioning an elongated channel member in contact with a planar surface of a rock formation;*

*reinforcing the channel member with a longitudinal embossment extending the length of the channel member;*

*positioning an opening in the channel member;*

*positioning a bearing plate having a contact surface in overlying relation with the channel member around the opening therethrough;*

*straddling portions of the longitudinal embossment by leg portions of the bearing plate;*

*positioning a central portion of the bearing plate within the opening of the channel member so that an opening in the bearing plate is aligned with the opening of the channel member;*

*restraining longitudinal movement of the bearing plate on the channel member; and*

*extending an anchor bolt through the aligned openings in the bearing plate and the channel member into engagement with the rock formation to compress the bearing plate against the channel member to maintain the channel member in bearing contact with the surface of the rock formation.*

* * * * *

UNITED STATES PATENT AND TRADEMARK OFFICE

CERTIFICATE OF CORRECTION

PATENT NO. : RE 35,902
APPLICATION NO. : 08/612128
DATED : September 22, 1998
INVENTOR(S) : Frank Calandra, Jr. et al.

It is certified that error appears in the above-identified patent and that said Letters Patent is hereby corrected as shown below:

Title Page, [73] Assignee, "Paittsburgh" should read --Pittsburgh--.

Title Page, [57] ABSTRACT, line 8, "extend" should read --extends--.

Column 1 Line 42 "to utilized" should read --to utilize--.

Column 3 Line 52 "bearing pates" should read --bearing plates--.

Column 5 Line 52 "flanges 26 and 2" should read --flanges 26 and 28--.

Column 5 Line 59 "flanges 26 and 2" should read --flanges 26 and 28--.

Column 7 Line 41 "is positioned" should read --are positioned--.

Column 7 Line 63 "embossment o" should read --embossment of--.

Column 8 Line 61 after "contact of the" delete "1".

Column 9 Line 21 "central portion 51" should read --central portion 73--.

Signed and Sealed this

Twelfth Day of February, 2008

JON W. DUDAS
*Director of the United States Patent and Trademark Office*

UNITED STATES PATENT AND TRADEMARK OFFICE

CERTIFICATE OF CORRECTION

PATENT NO. : RE 35,902 C1
APPLICATION NO. : 90/006362
DATED : March 21, 2006
INVENTOR(S) : Frank Calandra, Jr. et al.

It is certified that error appears in the above-identified patent and that said Letters Patent is hereby corrected as shown below:

Title Page, Item (10) Number: "US RE35,902 F1" should read --US RE35,902 C1--.

Signed and Sealed this

Ninth Day of December, 2008

JON W. DUDAS
*Director of the United States Patent and Trademark Office*

UNITED STATES PATENT AND TRADEMARK OFFICE

CERTIFICATE OF CORRECTION

PATENT NO. : RE 35,902 C1
APPLICATION NO. : 90/006362
DATED : March 21, 2006
INVENTOR(S) : Calandra, Jr. et al.

It is certified that error appears in the above-identified patent and that said Letters Patent is hereby corrected as shown below:

(1) Title Page, Item [73] Assignee: "Jenmar Corporation" should read
-- Jennmar Corporation --

(2) Column 2, Line 11, Claim 17, "so than an opening" should read
-- so that an opening --

Signed and Sealed this

Thirteenth Day of October, 2009

David J. Kappos

David J. Kappos
*Director of the United States Patent and Trademark Office*

US00RE35902F1

(12) EX PARTE REEXAMINATION CERTIFICATE (5305th)

United States Patent
Calandra, Jr. et al.

(10) Number: US RE35,902 F1
(45) Certificate Issued: Mar. 21, 2006

(54) BEARING PLATE

(75) Inventors: Frank Calandra, Jr., Pittsburgh, PA (US); John C. Stankus, Canonsburg, PA (US); Eugene H. Stewart, Pittsburgh, PA (US)

(73) Assignee: Jenmar Corporation, Pittsburgh, PA (US)

Reexamination Request:
No. 90/006,362, Aug. 23, 2002

Reexamination Certificate for:

| | |
|---|---|
| Patent No.: | **Re. 35,902** |
| Issued: | **Sep. 22, 1998** |
| Appl. No.: | **08/612,128** |
| Filed: | **Mar. 7, 1996** |

Related U.S. Patent Documents

Reissue of:

| | |
|---|---|
| (64) Patent No.: | **5,292,209** |
| Issued: | **Mar. 8, 1994** |
| Appl. No.: | **08/061,841** |
| Filed: | **May 14, 1993** |

(51) Int. Cl.
*E21D 21/00* (2006.01)

(52) U.S. Cl. ..... 405/302.1; 405/259.1; 405/288; 411/545

(58) Field of Classification Search ..... None
See application file for complete search history.

(56) References Cited

FOREIGN PATENT DOCUMENTS

| | | |
|---|---|---|
| CA | 1168459 | 6/1984 |
| GB | 2075090 | 11/1981 |
| ZA | 8102674 | 6/1982 |

*Primary Examiner*—Michael Safavi

(57) ABSTRACT

An elongated channel member for supporting the surface of an underground rock formation includes a base portion with a bearing surface for contacting the rock strata and an opposite surface having a longitudinally extending central rib and flanged edges for resisting deflection and bending of the channel member under the load of the rock strata. A plurality of openings spaced a preselected distance apart extend through the central rib. A bearing plate is positioned in overlying abutting relation with each opening in the channel member. The bearing plate includes embossed areas and longitudinally flanged edges that are complementary in shape with the central rib and flanges on the channel to securely engage the bearing plate on the channel member. Thus, the bearing plate engages the channel member to restrain longitudinal and lateral movement of the bearing plate on the channel member and stiffen the channel member to resist bending. An anchor bolt extends through the aligned openings in the bearing plate and channel member into a bore hole drilled in the rock formation. Anchoring the bolt in the bore hole compresses the bearing plate against the channel member to urge the channel member into compressive relation with the surface of the rock formation to support the rock formation.

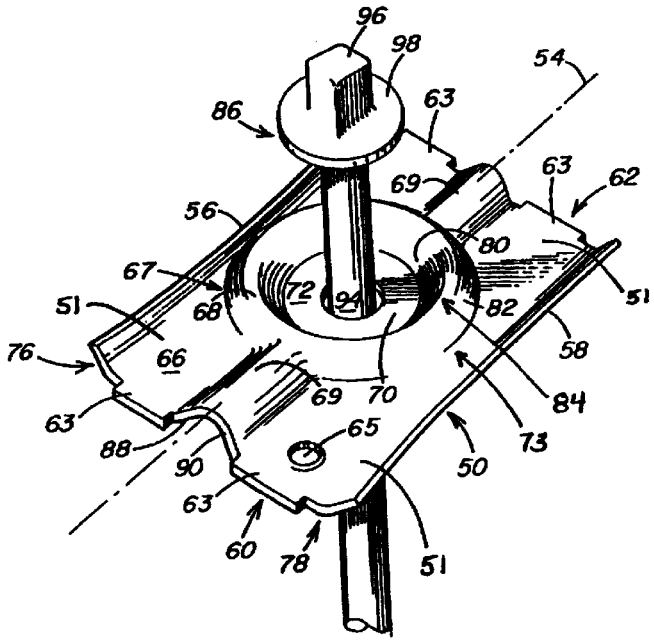

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–16 and 21–24 is confirmed.

Claim 17 is determined to be patentable as amended.

Claims 18–20, dependent on an amended claim, are determined to be patentable.

17. A method for supporting a rock formation comprising the steps of, positioning an elongated channel member in contact with a planar surface of a rock formation, reinforcing the channel member with a longitudinal embossment extending the length of the channel member, positioning openings in the channel member in spaced relation along the length of the embossment, positioning a bearing plate having a contact surface in overlying abutting relation with the channel member [around] *entirely encircling* each opening therethrough, positioning a recessed portion of the bearing plate within the opening of the channel member so than an opening in the bearing plate is aligned with the opening in the channel member, restraining longitudinal movement of the bearing plate on the channel member, restraining lateral movement of the bearing plate on the channel member, and extending an anchor bolt through the aligned openings in the bearing plate and the channel member into engagement with the rock formation to compress the bearing plate against the channel member to maintain the channel member in bearing contact with the surface of the rock formation.

* * * * *